(12) United States Patent
Hayko et al.

(10) Patent No.: US 7,281,047 B2
(45) Date of Patent: Oct. 9, 2007

(54) SYSTEM AND METHOD FOR AUTOMATIC PROVISION OF AN APPLICATION

(75) Inventors: James Steven Hayko, Napean (CA); Paul Zhuren Cai, Gloucester (CA)

(73) Assignee: Cognos Incorporated, Ottawa, Ontario (CA)

( * ) Notice: Subject to any disclaimer, the term of this patent is extended or adjusted under 35 U.S.C. 154(b) by 663 days.

(21) Appl. No.: 09/761,433

(22) Filed: Jan. 16, 2001

(65) Prior Publication Data
US 2002/0095522 A1  Jul. 18, 2002

(51) Int. Cl.
*G06F 15/16* (2006.01)
*G06F 9/44* (2006.01)

(52) U.S. Cl. ...................... 709/229; 717/172

(58) Field of Classification Search ........... 709/221, 709/220, 217, 229; 713/201; 717/178, 177, 717/168, 173, 174, 172, 171, 167
See application file for complete search history.

(56) References Cited

U.S. PATENT DOCUMENTS

| | | | | |
|---|---|---|---|---|
| 5,884,035 | A * | 3/1999 | Butman et al. | 709/218 |
| 5,931,679 | A | 8/1999 | Funahashi | |
| 6,009,464 | A * | 12/1999 | Hamilton et al. | 709/219 |
| 6,067,416 | A * | 5/2000 | Fraser | 717/178 |
| 6,074,434 | A * | 6/2000 | Cole et al. | 717/173 |
| 6,314,565 | B1 * | 11/2001 | Kenner et al. | 717/171 |
| 6,347,398 | B1 * | 2/2002 | Parthasarathy et al. | 717/178 |
| 6,516,346 | B1 * | 2/2003 | Asco et al. | 709/221 |
| 6,606,744 | B1 * | 8/2003 | Mikurak | 717/174 |
| 6,643,679 | B1 * | 11/2003 | Erickson et al. | 718/101 |
| 6,675,381 | B1 * | 1/2004 | Yamaguchi | 717/168 |
| 6,675,382 | B1 * | 1/2004 | Foster | 717/177 |
| 6,701,441 | B1 * | 3/2004 | Balasubramaniam et al. | 713/201 |

OTHER PUBLICATIONS

Harry Newton, Newton Telecom Dictionary, Feb. 2002, 18th Updated and expanded edition by at p. 171.*
Sun Microsystems Delivers Next Generation Client-side Java Technology, obtained from "The Source for Java Technology" at http://java.sun.com/pr/2000/06/pr000606-03.html on Mar. 19, 2001 (5 Pages).
Announcing Java Web Start Technology Welcome to a Brand-New World, obtained from "The Source for Java Technology" at http://java.sun.com/features/2000/06/webstart.html on Mar. 19, 2001 (6 Pages).
Java Web Start, Version 1.0, Architecture, obtained from The Source for Java Technology at http://java.sun.com/products/javawebstart/architecture.html on Mar. 19, 2001 (4 Pages).

(Continued)

*Primary Examiner*—Paul H. Kang
(74) *Attorney, Agent, or Firm*—Pearne & Gordon LLP

(57) ABSTRACT

A system and method are provided for the automatic updating or installation and invoking of a requested application on a client. The system and method form an application provision system which operates within a network containing at least one client and at least one server. The application provision system includes; a server resident process for controlling the provision of an application to a client, and client-server functionality that is deliverable to the client, the client-server functionality the provision of the application to the client by communicating with the server resident process.

22 Claims, 8 Drawing Sheets

OTHER PUBLICATIONS

Java Web Start, Version 1.0, Hot Topics, obtained from "The Source for Java Technology" at http://java.sun.com/products/javawebstart/ on Mar. 19, 2001 (2 Pages).

Java Web Start, Version 1.0, Frequently Asked Questions, obatined from "The Source for Java Technology" at http://java.sun.com/products/javawebstart/faq.html on Mar. 19, 2001 (20 Pages).

* cited by examiner

SYSTEM AND METHOD FOR AUTOMATIC PROVISION OF AN APPLICATION

FIELD OF THE INVENTION

The invention relates generally to a system and method for providing an application to a computer, and more particularly provides a browser based method and System for automatically updating or installation and invoking an application.

BACKGROUND OF THE INVENTION

The use of standardised formats for the exchange of documents over networks has become quite important with the wide use of the external, public Internet and internal, private intranets that are found within corporations. This information is commonly exchanged in so called web pages i.e. documents that are posted to a unique address. Such web pages are generally presented through the use of a mark-up language. The currently most common mark-up language is HTML or Hyper Text Mark-up Language. However, there are other mark-up languages including DHTML and XML that are currently in use or will be in use in the near future.

However, as the content of the web becomes richer it has become more common to find documents that are present in different formats which require specific applications for access to them. Some of these formats have become quasi standard for their particular application because of their widespread use. An example of such an application is Adobe Acrobat, Adobe Systems Inc., and its PDF (Portable Document Format) files. In order to read files of the various formats one must have the particular application installed locally. In cases where the file format is not common or the client is not configured with the appropriate application, the appropriate application must be downloaded and installed before the file can be accessed. This procedure usually includes exiting the browser, installing the program, and restarting the computer.

The above situation may also arise with respect to documents on a local corporate intranet. In this case documents of interest are selected by clients using clients of a network. Again the application required for the viewing and or manipulation of a requested web page, including any documents contained therein, may not be located on a client computer. Currently a system administrator of the corporation must either locally or remotely install the required application on the local machine. Again the client must often exit the browser application, install the required application and restart the computer. An analogous situation arises when a document was generated in a more recent version of an application than what currently resides on the client.

In the case of an installation it will be assumed that there are no files associated with the application currently located on the client therefore requiring that all files related to the application must be installed. In the case of an update it is assumed there are files associated with the application located on the computer. Some or all of these files will be re-installed during the updating procedure. There may also be files associated with the most recent version of the application that are not currently installed on the client and therefore must be installed during the update.

There are known approaches to the installation or updating of an application that is required for viewing and or manipulation of a document. It is common to encounter documents that have been posted on the Internet which have been created with an application that the requesting client does not have on their local machine. When such a document is encountered the client is queried as to whether they would like to install the appropriate application on their computer. If they respond positively they are directed to the appropriate web site, via a Universal Resource Locator (URL), where links are provided that facilitate the installation or updating. This process often occurs with a certain amount of user interaction however it can take place seamlessly without the need to exit the browser with a special implementation by the application in question. It often however occurs in a similar manner as a program installation. In these cases there is a dialogue, that is initiated by the remote server, concerning the updating or installation.

An alternative approach has been proposed which addresses the seamlessness of the procedure. There are approaches that are operable for applications written in a specific language. In one example the updating or installation and invoking application is specific to Java applications and it requires the user have the updating or installation and invoking application pre-installed on their client. However there are no known approaches that provide an automatic updating or installation of a required application that are independent of the application and browser, do not require pre-installed functionality on the client and do not require the client be rebooted after installation.

Therefore, there is a need for a system and method for providing a required application to a client automatically. Further the system and method should mitigate intervention by the client's user, be independent of the application, and not require that the client be rebooted after provision of the application.

SUMMARY OF THE INVENTION

The invention provides a system and method for the automatic updating or installation and invoking of requested application on a client. The system and method form an application provision system. The application provision system solicits minimal intervention by the user, is conducted in a secure environment and invokes the application without rebooting the operating system. The application provision system employs functionality located on both a client and a server that are elements of a network.

In accordance with one aspect of the invention an application provision system for use in a server. The server being connectable to a network that comprises at least one client and at least one server is provided. The application provision system comprises; a server resident process for controlling the provision of an application to a client, and client-server functionality that is deliverable to the client, the client-server functionality the provision of the application to the client by communicating with the server resident process.

In accordance with another aspect of the invention an application provision system for use in a server, the server being connectable to a network that comprises at least one client and at least one server, the client comprising an operating system and a browser is provided. The application provision system comprises; a server resident process which is able to respond to queries, a deliverable file that is deliverable to the client, the file including a platform independent executable program and parameter information, and a means for establishing a communications link for providing communications between the server resident process and the operating system of the client the server resident process is able to perform operations within the operating system of the client.

In accordance with another aspect of the invention a web page for delivery from a server to a browser operating on a client, the server and client being comprised by a network comprising at least one client and at least one server, the server comprising server based processes for automatic provision of an application, the web page for use in a system for the automatic provision of an application to the client is provided. The web page comprises; a platform independent executable program for the provision of communications between the client and server based processes, and parameter information wherein the parameter information is sufficient to initiate the server based processes and to determine if an application is installed on the client.

In accordance with another aspect of the invention a method of providing a requested application from a server to a client by an application provision system is provided. The method comprises the steps of; providing a first web page to a client, the first web page containing at least one link that can be selected wherein the link is associated with a document, receiving a request for a document by a server based process, from a client, providing a second web page to a client, the second web having client server functionality attached to it which requests an application to access the requested document, and providing the requested application to the client wherein the requested application allows the client to access the requested document.

In accordance with another aspect of the invention a method of receiving a requested application from a server to a client by an application provision system is provided. The method comprises the steps of, receiving a first web page from a server, the first web page containing at least one link that can be selected wherein the link is associated with a document, providing a request for a document to a server based process, from a client, receiving a second web page from a server, the second web having client server functionality attached to it which requests an application to access the requested document, and receiving the requested application from the server wherein the requested application allows the client to access the requested document.

In accordance with another aspect of the invention a method for providing a requested application by a server to a client connected to a network comprising at least one client and at least one server, the server comprising at least one web page for downloading by the at least one client is provided. The method comprising the steps of; providing client-server functionality and a server resident process on a server, delivering the client-server functionality to the client during the downloading of a web page to which the client-server functionality is attached, receiving by way of the server resident process a request for an application from the client, through the client-server functionality, and providing by way of the server resident process the requested application to the client, through the client-server functionality.

In accordance with another aspect of the invention a method for the automatic provision of a requested application from a server to a client; the server and client being elements of a network including at least one client and at least one server, the client operating a browser and an operating system is provided. The method comprises the steps of; downloading a first web page containing at least one link, the link indicating association a document, by a client from server to which the client is connected and in communications, selecting the a link on the downloaded web page, downloading a second web page by a client from the server to which the client is connected and in communications wherein a platform independent executable program is attached to the second web page, opening a new window of a browser operating on the client, invoking the platform independent executable program, invoking at least one server resident process, scanning the client, by the platform independent executable program to determine if an application to access the document is installed on the client, providing the requested application on the client if the requested application was not located on the client, and invoking the applications.

In accordance with another aspect of the invention a method for the automatic provision of a requested application from a server to a client; the server and client are elements of a network including at least one client and at least one server, the client operating a browser and an operating system is provided. The method comprising the steps of; providing a first page to a client, the first page having a link, the link being associated with a document, receiving a request for a second web page by way of the client selecting the link associated with the document, providing the second web page to the client wherein a platform independent executable program is attached to the second web page, receiving communications from the platform independent executable program that is executing on the client, invoking a server resident process, communicating with the platform independent executable program located on the client to facilitate the determination of whether an application to access the document is present on the client, providing files associated with the requested application to the client for installation of the requested application on the client, transferring files associated with the application requested by the client to the client for installation of the application on the client, and invoking the application.

In accordance with another aspect of the invention a computer readable memory element storing the instructions or statements for use in the execution in a computer of a method for the automatic provision of an application from a server to a client; the server and client are elements of a network including at least one client and at least one server, the client operating a browser and an operating system is provided. The method comprising the steps of; providing a first page to a client, the first page having a link, the link being associated with a document, receiving a request for a second web page by way of the client selecting the link associated with the document, providing the second web page to the client wherein a platform independent executable program is attached to the second web page, receiving communications from the platform independent executable program that is executing on the client, invoking a server resident process, communicating with the platform independent executable program located on the client to facilitate the determination of whether an application to access the document is present on the client, providing files associated with the requested application to the client for installation of the requested application on the client, transferring files associated with the application requested by the client to the client for installation of the application on the client, and invoking the application.

In accordance with another aspect of the invention an electronic signals for use in the execution in a computer of a method for the automatic provision of a requested application from a server to a client; the server and client are elements of a network including at least one client and at least one server, the client operating a browser and an operating system is provided. The method comprising the steps of; providing a first page to a client, the first page having a link, the link being associated with a document, receiving a request for a second web page by way of the client selecting the link associated with the document, providing the second web page to the client wherein a platform independent executable program is attached to the second web page, receiving communications from the platform independent executable program that is executing on the client, invoking a server resident process, communicating with the platform independent executable program located on the client to facilitate the determination of whether an application to access the document is present on the client, providing files associated with the requested application to the client for installation of the requested application on the client, transferring files associated with the application requested by the client to the client for installation of the application on the client, and invoking the application.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION OF EMBODIMENTS OF THE INVENTION

Figure 1:
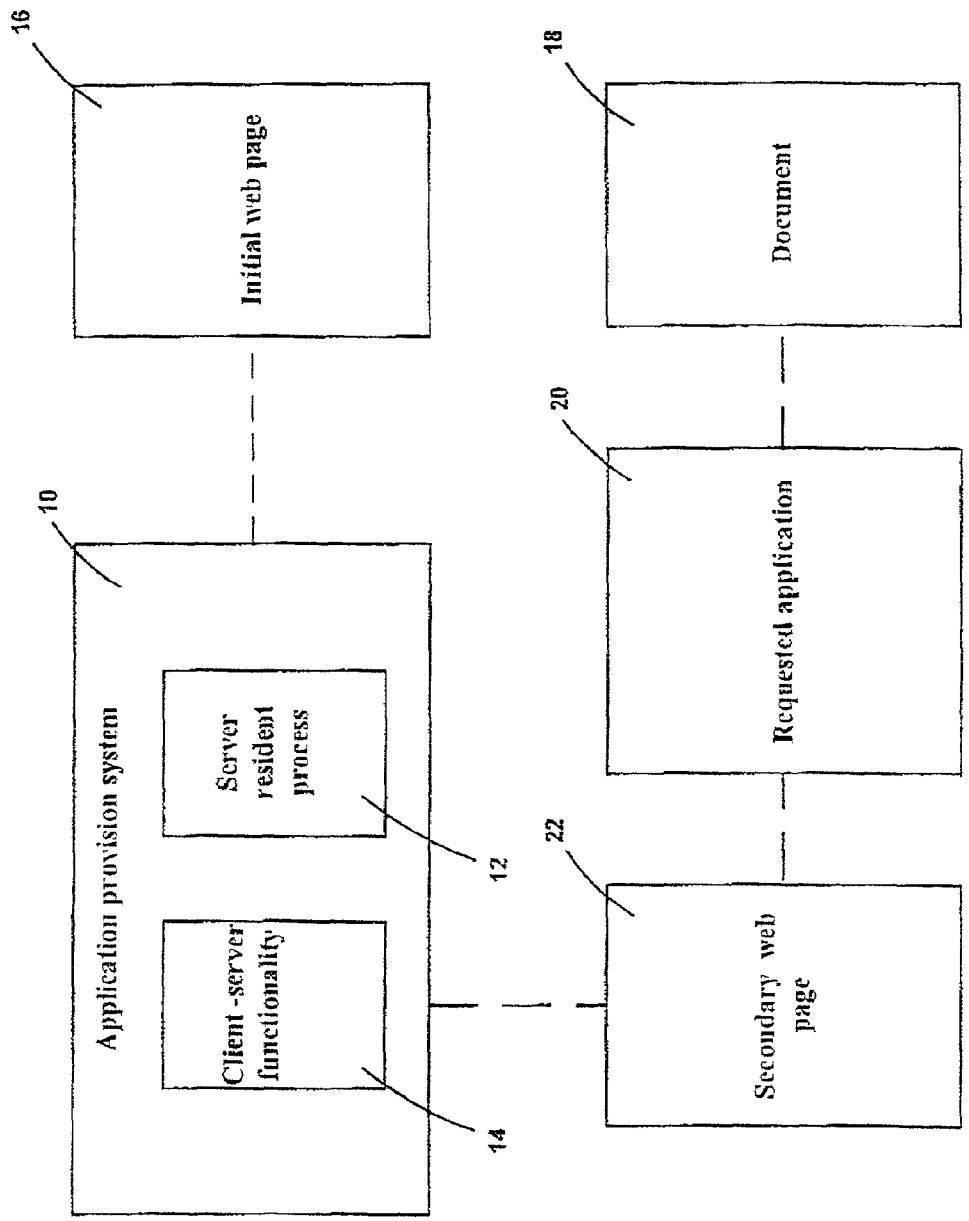
FIG. 1 is a schematic diagram illustrating the system of the application provision system, in accordance with one embodiment of the invention.

An overview of the provision of a requested application according to an embodiment of the invention is presented in FIG. 1. Application provision system 10 contains server resident elements 12 and client loadable elements 14. Client loadable elements 14 comprise client-server interaction functionality that is in the form of a platform independent executable program. Server resident processes 12 comprise any server resident process that is able to provide intelligent functionality to a server by being able to derive answers and respond to queries. Server resident processes 12 of application provision system 10 control the operation of application provision system 10. Client loadable elements 14 are attached to secondary web page 22.

Document 18 which the viewer of web page 16 would like to retrieve requires application 20 to access the information contained therein. Selection of the link comprised by initial web page 16, leads to secondary web page 22 which invokes client loadable elements 14 which are attached to secondary web page 22 and are now resident on the client. If the client does not already comprise requested application 20, client provision system 10 provides requested application 20 to the client. When application 20 is resident on the client and invoked, document 18 is retrieve.

The provision of an application encompasses both the updating of a version of the application, already extant on the client, to the requested version, and the installation of the requested application when an older version is not extant on the client. The provision of an application further encompasses the invoking of the requested application after either updating or installation.

The current embodiment of the invention provides an application provision system, and method of operation thereof, that automatic provides a requested application to a client of a network. The network contains at least one client and at least one server. The application provided by the application provision system is installed or updated and invoked, as necessary, without rebooting the client's operating system.

Figure 2:
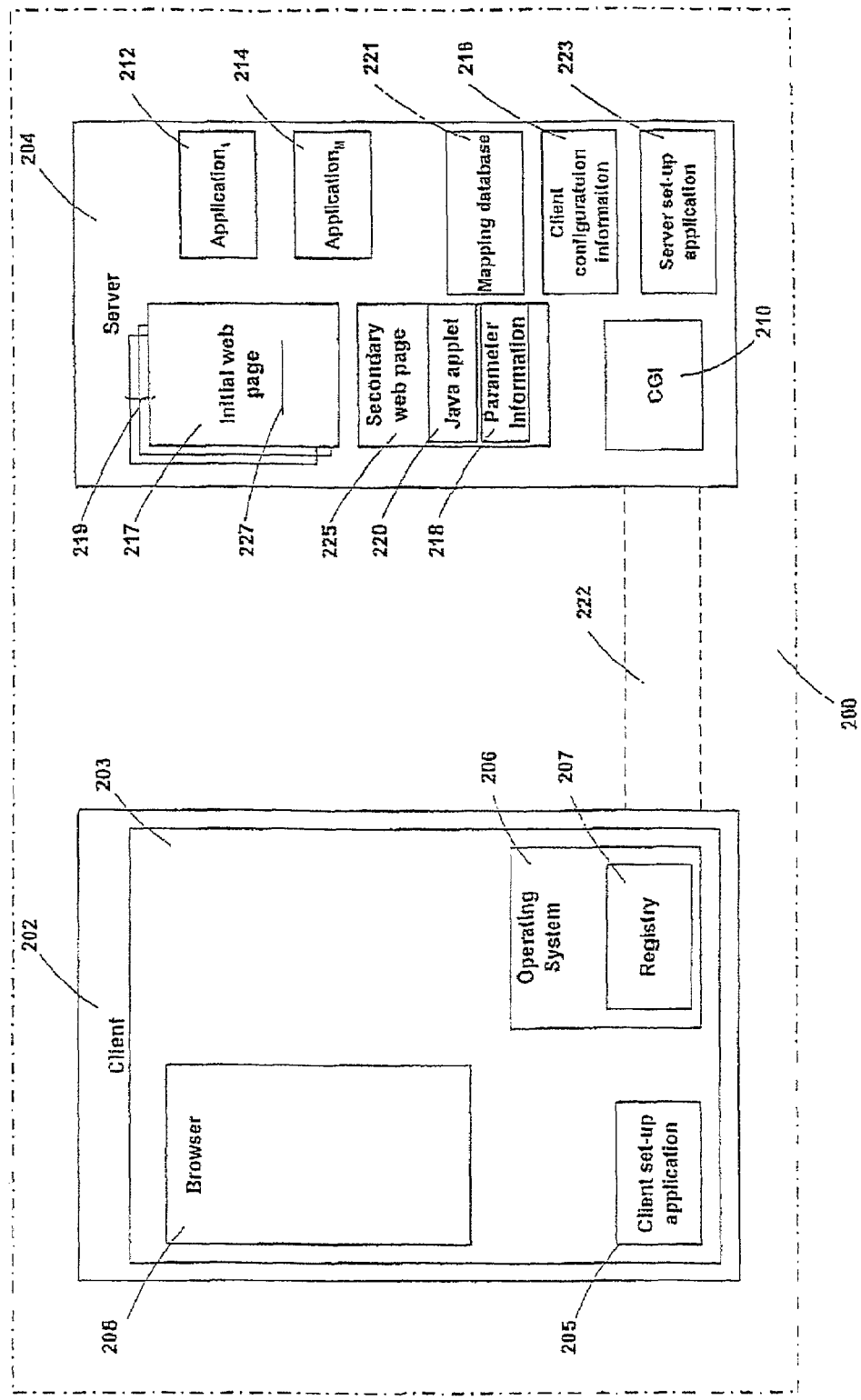
FIG. 2 is a schematic diagram illustrating the system of the application provision system, in accordance with another embodiment of the invention.

FIG. 2 is a schematic diagram illustrating a network that includes a client and server in which the current embodiment of the invention is suitably used. Network 200 is a local area network of which a corporate Intranet is an example. Local area networks and their implementation would be known to those of skill in the art. Network 200 contains client 202 and server 204. Client 202 and sever 204 are connected to one another by communications link 222. Communications link 222 provides for high bit rate communications between client 202 and server 204. The use of a high bit rate communications link is desired as it reduces the time required for the transmission of large files between client 202 and server 204. Such a communications link will be apparent to those of skill in the art. In an alternative embodiment network 200 contains at least one client and one server.

In an alternative embodiment network 200 is a wide area network of which the Internet is an example. In this embodiment client 202 and server 204 will be comprised by different local area networks. In an embodiment where network 200 is the Internet communications link 222 is formed by links such as so called T1 links or broadband type connections including ADSL and cable, as will be apparent to those of skill in the art.

The structure and operation of client 202 will be known to one skilled in the art. Client 202 contains memory 203 for the storage of applications as will be known to those of skill in the art. In the current embodiment client 202 contains, and is running, operating system 206. In the current embodiment operating system 206 is a 32-bit Windows operating system of Microsoft Corporation, Redmond Wash. Examples of operating systems encompassed by operating system 206 are Windows 95, Windows 98, Windows 2000 and NT 4.0. Client 202 also contains browser 208. In the current embodiment browser 208 is either Internet Explorer of Microsoft Corporation or Netscape Navigator of Netscape Communications Corporation, Mountainview Calif. Browser 208 is version 4.0 or higher and supports both JavaScript and Java with these options enabled. Client 202 further includes registry 207 and client setup application 205. Client 202 does not initially contain code of the application provision system.

Server 204 contains initial or source web page 217. Initial web page 217 is one of a plurality of web pages 219 that are resident on server 204. Initial web page 217 is written with Hyper-Text Mark-up Language (HTML). In an alternative embodiment initial web page 217, and the plurality of web pages 219, are created with a mark up language including XML and DHTML. Initial web page 217 contains at least one link, including link 227, to another web page resident on server 204. In the current embodiment these links are hyper-text links as will be known to those of skill in the art. Each link is typically defined by a universal resource locator (URL). In another embodiment web page 217 and plurality of web pages 219 are comprised by other servers to which client 202 and server 204 are connected and in communication with.

In the current embodiment link 227 is directed to a secondary web page 225. Attached to secondary web page 225 are lava applet 220 and parameter information 218. Java applet 220 provides a secure, platform independent executable program that is embedded in secondary web page 225 for delivery from server 204 to client 202. Java applet 220 is able to interact with the native operating system 206 and communicates with server 204 from which it originated. Java applet 220 is digitally signed, where digital signing is a separate procedure that is equivalent to 'wrapping' the Java applet and would be apparent to those of skill in the art. This signing is performed once at build time and lives indefinitely. Browser 208 will intercept Java applet 220 and, using built-in authentication mechanisms, as will be known to those of skill in the art, will validate the security information contained therein.

Common gateway interface (CGI) 210 provides "intelligent" functionality to server 204 and controls the provision of applications and information to client 202. CGI 210 is able to derive answers and respond to a specific set of queries. CGI 210 provides a requested application's name, registry and version location information, determines if the version of the requested application installed on client 202 is "older" than the version located on server 204 and delivers files via a stream mechanism to functionality on client 202. CGI 210 also manages the plurality of web pages 219. It will be apparent to one skilled in the art that there may be other server resident processes may include other processes than CGI 210. The server resident processes may further include processes such as those that interface with CGI 210.

Server 204 also contains application 212. Application 212 is an application that may be provided to client 202 upon request for application 212. Application 212 encompass all files required for the installation and/or updating of the applications when it is requested by client 202. In an embodiment of the invention application 212 is the most recent version of these application where the "most recent version" is the most recent version available to network 200. In another embodiment of the invention application 212 is located on another server of network 200 to which client 202 and server 204 are connected and in communications. Server 204 also contains client configuration file 216 which outlines the configuration information for client 202.

Mapping database 221 is also resident on server 204. In the current embodiment mapping database 221 is a file containing the mappings between applications 212 and its physical storage location on server 204. Mapping database 221 allows CGI 210 to locate application 212 for provision to client 202. Mapping database 221 facilitates the acceptance of queries from clients 202. Mapping database 221 also facilitates the provision of installable components of application 212 to client 202. Mapping database 221 contains information for locating server accessible versions of a requested application and its version information, on a per platform basis. Thus, application 212 is linked to CGI 210. In an alternative embodiment there are a plurality of applications located on servers of network 200 that may be provided to client 202 upon request for the application. In this embodiment mapping database 221 contains mapping information for the plurality of applications located on the servers of network 200 to which client 202 and server 204 are connected and in communications.

In the current embodiment mapping database 221 is created and modified by server setup application 223 of server 204. Server setup application 223 installs files on server 204 that are to be accessed by the client setup application 205. This functionality may be provided for by the existing server setups.

Figure 3:
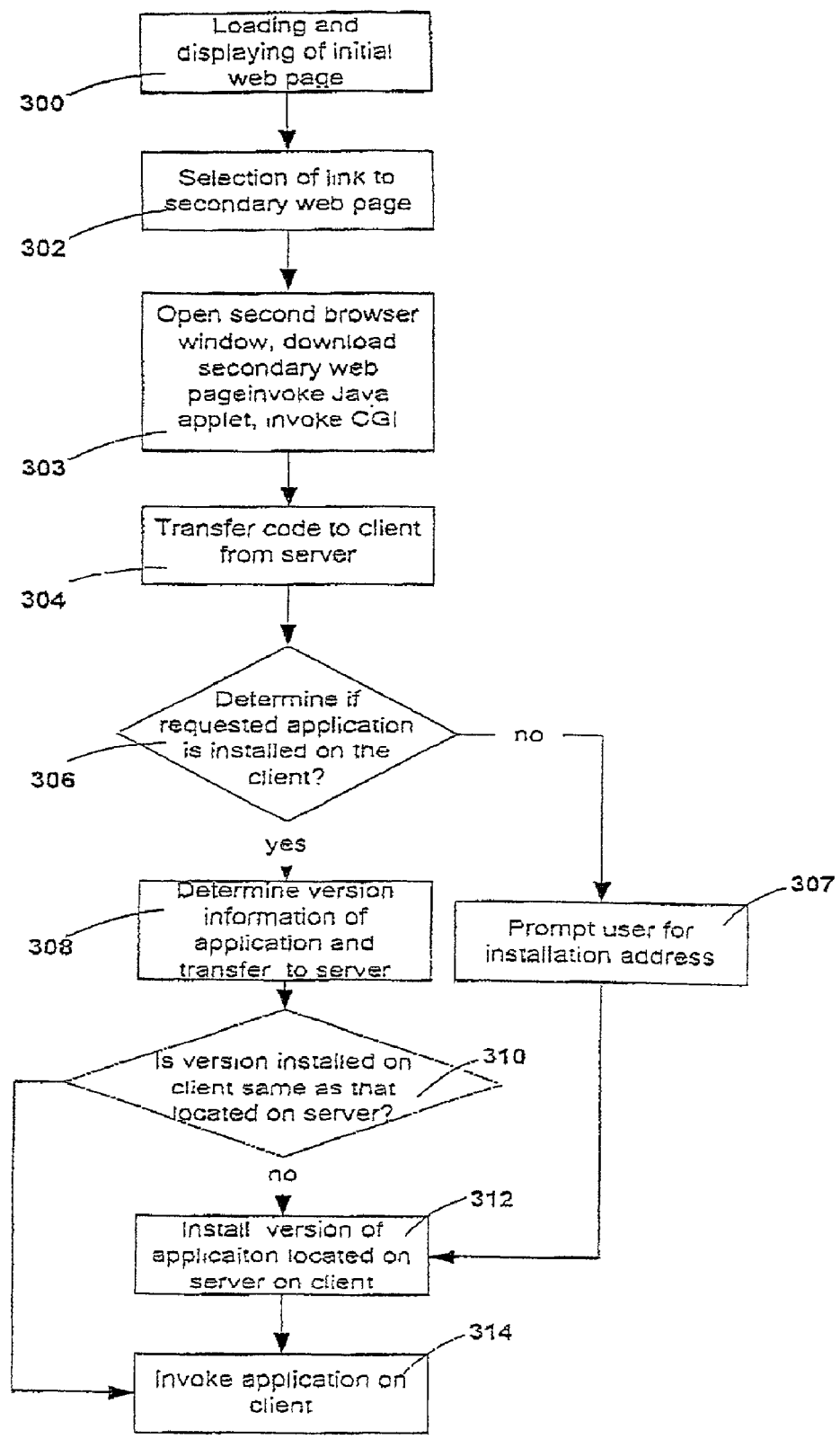
FIG. 3 is a flow chart illustrating the overall method of the application provision system, in accordance with one embodiment of the invention.
Figure 4:
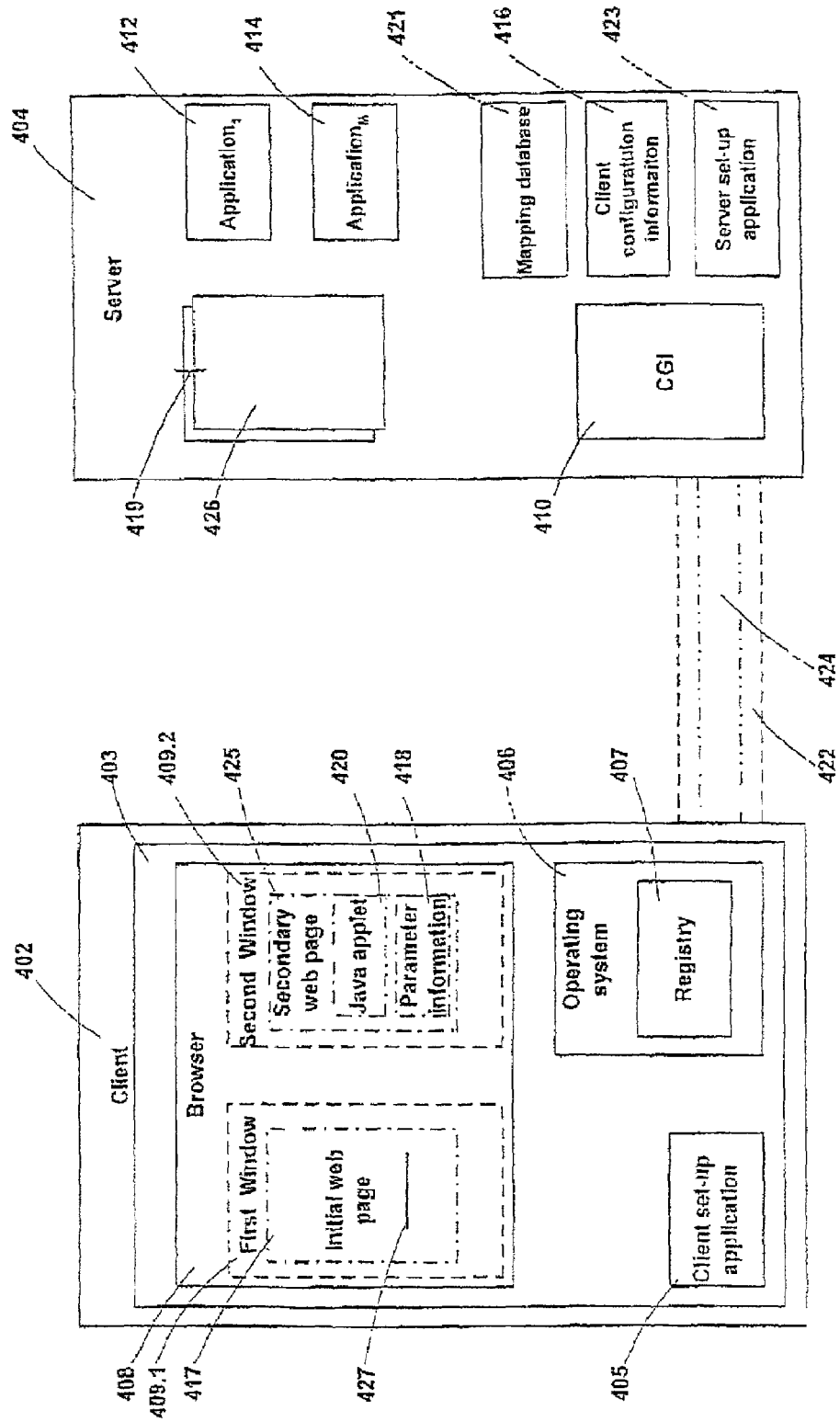
FIG. 4 is a schematic diagram illustrating the system of the application provision system during the execution of the method of the application provision system, in accordance with another embodiment of the invention.

The overall method for provision of an application according to the application provision system is comprised by the flow chart presented in FIG. 3. FIG. 4 is a schematic diagram illustrating a network that includes a client and server in which the current embodiment of the invention is suitably used. FIG. 4 presents this network during the operation of the application provision system of the current embodiment. At step 300 initial web page 417 is loaded and displayed by browser 408 in initial browser window 409.1 located on client 402. Initial web page 417 can be any page that contains a link to at least one other web page. In the current embodiment web page 417 is either a Table of Contents style page or a Portal entry point managed by CGI 410.

Initial web page 417 which is loaded and displayed at step 300 contains at least one link including link 427, the provides a Universal Resource Locator (URL) to another web page. In the current embodiment the user of client 402 wishes to access document 426 on server 404. Document 426 requires the use of an application other than browser 408 which is currently being used for the viewing of initial web page 417. In another embodiment document 426 is located on a server other than server 404 that connected to and in communications with client 402 and server 404.

At step 302 the user of client 402 selects link 427 to access web page 426. However, link 427 points to secondary web page 425. Secondary web page 425 is downloaded by client 402 from server 404. At step 303*a* new instance of browser 408 is invoked and new browser window 409.2 is opened. Java applet 420 is invoked. Java applet 420 dialogues to server 404 and CGI 410 is invoked at step 303. Parameter information 418 allows CGI 410 to determine if the application required for viewing and or manipulation of document 426 is installed on client 402. Parameter information 418 is sufficient for invoking CGI 410 with the necessary parameters and within the specified context i.e. the version appropriate for the particular browser and operating system of the client.

Second browser window 409.2 is opened at step 303 with Java applet 420 and parameters from parameter information 418. The parameters of parameter information 418 include; the requested application's name as a unique registry key text, any required application parameters such as version and start-up mode. For example, the parameters of parameter information 418 may indicate a thin or thick client, and application-specific context information that may include items such as what information should be presented to the client such as, how and what to display and/or manipulate. Secondary web page 425 will have a message area that indicates to the user of client 402 that an application is being provided to client 402 and will act as the hosting window for all browser specific code (described below) of the application provision system. Parameter information 418 contained in secondary web page 425 of second browser window 409.2 is dynamically generated and does not require changes when the version of the requested application changes as it updated version specific information automatically from mapping database 421. In the current embodiment second browser window 409.2 hosting web page 425 is located at position (0,0) (top left corner) on the desktop of client 402. Second browser window 409.2 will be sized such that it can display all the pertinent information that is required of it. In the current embodiment it will be created to reside on top of other windows with the user of client 402 having the ability to change the window order of the desktop by activating other software on client 402.

One aspect of the application provision system that permits the desired functionality is the ability for two way communications between CGI 410, and client-resident Java applet 420. This communication allows CGI 410 to determine if a requested application is installed and/or up to date on client 402 and provide files to operating system 406 of the client 402.

The ability of Java applet 420 to access files, on behalf of CGI 410, within operating system 406 of client 402 is not a standard functionality provided for by either a server resident process or operating system 406 of client 402. This access requires that secure browser hosted processes (Java Applet 420 in the current embodiment) and a communication "pipe" 424 within the communication link 422 be established between CGI 410 and operating system 406. Pipe 424 is often in place for communications from CGI 410 to operating system 406 of client 402 but it is seldom in place to facilitate communications from operating system 406 of client 402 to CGI 410. The process for establishing pipe 424 involves interactions between client browser 408 and operating system 406. This process is initiated after the selection of link 427 within initial web page 417 (step 302 of FIG. 3) and generally occurs at step 303 of FIG. 3.

Figure 5:
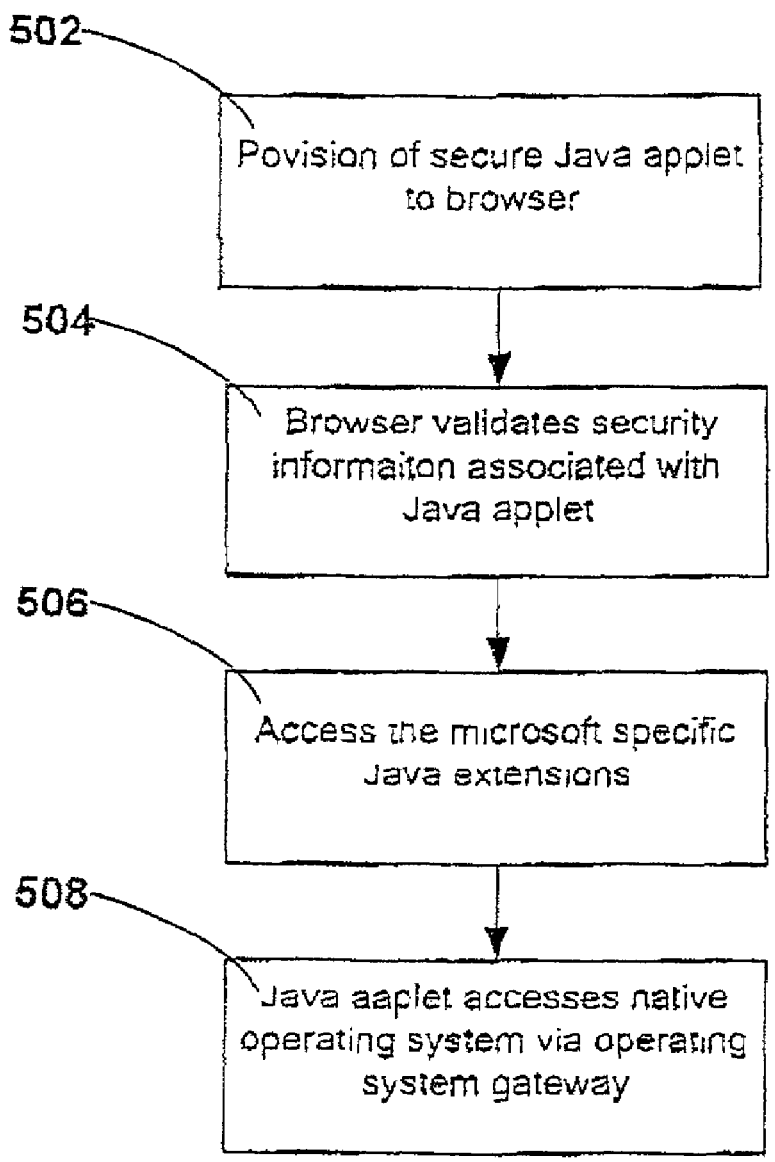
FIG. 5 is a flow chart illustrating the method for establishing a communications link between to client operating system and the server where the browser operating on the client is Internet Explorer, in accordance with one embodiment of the invention.

In an embodiment where browser 408 is Internet Explorer the method of establishing communications pipe 424 is illustrated in FIG. 5. At step 502 server 404 provides web page 425, containing Secure Java applet 420 to browser 408. At step 504 browser 408 validates the security information associated with digitally signed Java applet 420 by assessing either information provided by the user of client 402 or from the cache of client 402. With the security information validated browser 408 loads Java applet 420 into memory 403 of client 402. Java applet 420 is then invoked. Since web page 425 that is invoked and presented to client 402 is browser specific, the application provision system, is embedded with browser-specific logic to use capabilities provided by the browser. In this embodiment, Internet Explorer runs a specialized version of the Sun Java virtual machine which is embedded in Internet Explorer. Using Microsoft Java extensions Java applet 420 is able to directly access operating system 406 using resources provided through Jdirect, the current browser to operating system gateway mechanisms appropriate for Microsoft operating systems. Other appropriate browser to operating system gateway mechanisms will be apparent to those of skill in the art and are within the scope of the invention. At step 506 the Microsoft Java virtual machine accesses the Microsoft extensions. At step 508 Java applet 420 access resources of operating system 406 through the operating system gateway. Java applet 420 then installs, invokes and reads output from local executable files.

Figure 6:
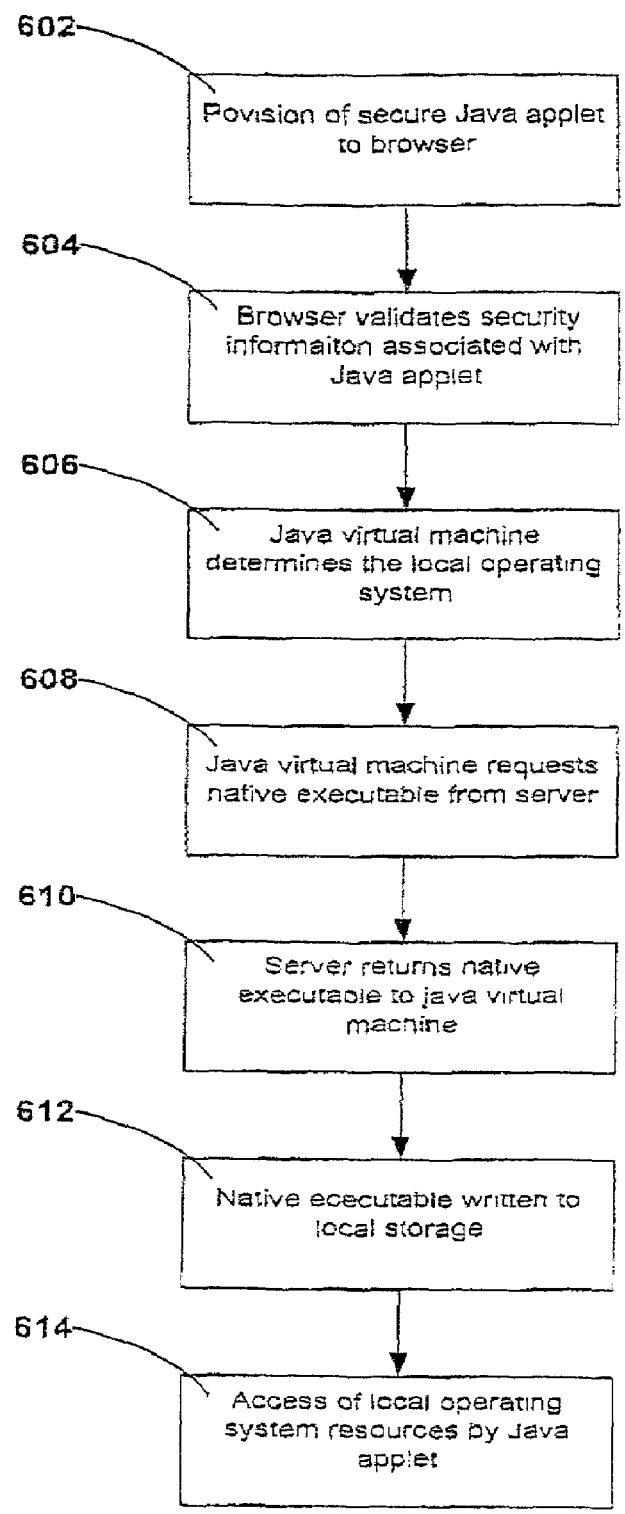
FIG. 6 is a flow chart illustrating the method for establishing a communications link between the client operating system and the server where the browser operating on the client is Netscape Navigator, in accordance with one embodiment of the invention.

In another embodiment browser 408 of client 402 is Netscape Navigator. The process for establishing pipe 424 between operating system 406 of client 402 is presented in FIG. 6. The process presented in FIG. 6 contains more steps than the process of FIG. 5 as Netscape Navigator does not include built in Microsoft extensions to the core Sun Application Protocol Interface (API). At step 602 server 404 provides secondary web page 425 with embedded, digitally signed Java applet 420 to browser 408. Since web page 425 that is invoked and presented by client 402 is browser specific, the application provision system, is embedded with browser-specific logic to use capabilities provided by the browser. At step 604 browser 408 validates the security information contained in Java applet 420 by assessing either information from the user of client 402 or from the cache of client 402. With the security information validated Java applet 420 is loaded into memory 403 of client 402. Java applet 420 is then invoked. At step 606 the standard Sun Java virtual machine determines the nature of local operating system 406. At step 608 the Sun Java virtual machine requests a native executable from originating server 404. Server 404 returns to native executable to the Java virtual machine via stream communications at step 610. This native executable is an operating system specific executable that is capable of determining: a) if an instance of an application 212 is installed on the client system; and b) what version of the application is installed. Java applet 420 then writes the native executable to local non-volatile storage, which in the current embodiment is a hard disk, at step 612. Java applet 420 directly accesses resources of operating system 406 via the Java Native Interface (JNI) through this native executable, at step 614. Once the installation status of the client has been determined Java applet 420 can, as necessary invoke the downloaded executable which can install, invoke and read output form the appropriate local executable.

With the communication between server 404 (CGI 410) and operating system 406 established, the identity of browser 408 determined, and second browser window 409.2 opened (step 303) information related to the installation status and version of the requested application on client 402 can be collected.

Java applet 420 now resident on client 402, is in communication with server 404. Java applet 420 performs various secure operations within operating system 406 of client 402 on behalf of server 404 (CGI 410). These secure operations include: scanning the file system; determining installation location and version information (i.e. accessing the registry on Windows); obtaining system properties such as current operating system and version; creating files and directories; deleting files and directories and moving files and directories. Other secure operations performed by the Java applet 420 will be apparent to those of skill in the art. The ability of Java applet 420 to perform installation and version checking is dependant on Java applet 420 having the security authorisations allowing for the execution of code related to local file system access and system properties access.

Browser specific code, and the control of it, that facilitates the secure operations performed by Java applet 420 is transferred from server 404 to the client 402 at step 304. The security authorisations are facilitated by Java applet 420 being bundled and digitally signed. While the subsequent process is the same, pending minor variations in coding required for the particular browsers being used by client 402, functionality to determine which browser is being operated is required as security models will likely be different. In one embodiment different security models are incorporated in Java applet 420 for Internet Explorer and Netscape Navigator, the two currently common browsers. Java applet 420 will initiate different code, via secondary web page 425, depending on the identity of browser 408 is operating on client 402.

The determination of whether the requested application is installed on client 402 is now made at step 306. This determination is facilitated by communications between client 402 (Java applet 420) and server 404 (CGI 410). In the current embodiment registry 407 is scanned by Java applet 420 to determine if the installation footprint of the requested application is contained therein. In an alternative embodiment other mechanisms, as will be apparent to those skilled in the art, that provide the installation information would be likewise scanned. If the requested application's installation footprint key is not located in registry 407 it is assumed that the requested application is not installed on client 402 and the method proceeds to step 307 where the user of client 402 is prompted to identify a location for the installation of the requested application. After an installation location has been specified (or determined programmatically) the necessary files are downloaded from server 404 and an automatic installation occurs at step 312. If the application's installation footprint is detected during the scanning of registry 407 at step 306 the process moves to step 308 where details of the version of the application installed on client 402 are forwarded to server 404.

Figure 7:
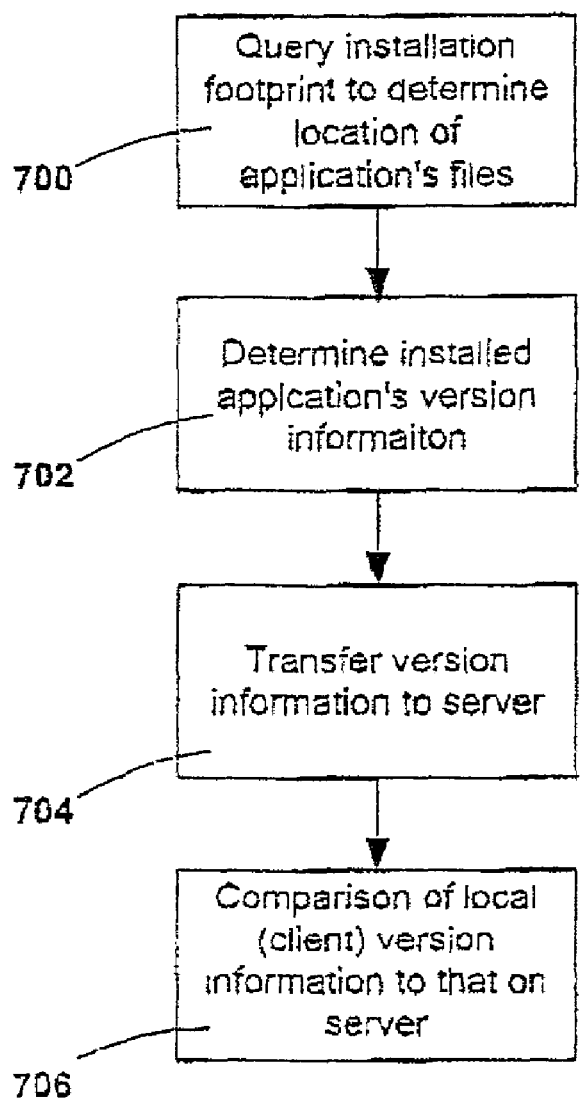
FIG. 7 is a flow chart illustrating the method of determining the version of an application, in accordance with one embodiment of the invention.

At step 310 a query is made by Java applet 420 to server 404 as to whether the most recent version of the application has been installed on client 402. Details concerning the determination of the application's version are presented in the flow chart of FIG. 7. At step 700 the installation footprint is queried to determine the location of the files associated with the application. At step 702 the version information of an existing local installation is determined. In the current embodiment the installation information is ascertained by querying registry 407. In alternative embodiments, where alternative platforms are used the appropriate location within client operating system 406 would be queried to determine the installation information.

The ability to determine the version of the requested application on client 402 is provided for by the modification of the generic setup program such that the install setup executable is a component of all the applications that support the application provision system (i.e. it is assumed that the installation/update executable has sufficient intelligence to accept arguments which will customize the installation procedure).

Once The requested application's version information is located it is transferred to server 404 (CGI 410), at step 704. The requested application's name received from client 402 is used to determine which of the requested application's files installed on client 402 need to be checked. A requested application's name is used as a key for determining the location of files associated with a given application on server 404. Mapping information contained in mapping database 421 is used to locate server resident files associated with application 412. The server compares the version information for the installation on client 402 with the version located on server 404 (application 412) at step 706.

If the version of the application installed on client 402 is the same as the version located on server 404 the method of the application provision system progresses to step 314 where the application is invoked. If the version of the application installed on client 402 is not the same as the version of application 412 installed on server 404 the method of the application provision system progresses to step 312 where the application is updated with the installation of the version of application 412 located on server 404. The application is then invoked at step 314. Java applet 420 invokes the application at step 314 such that requested document 426 is loaded into the recently invoked application.

Figure 8:
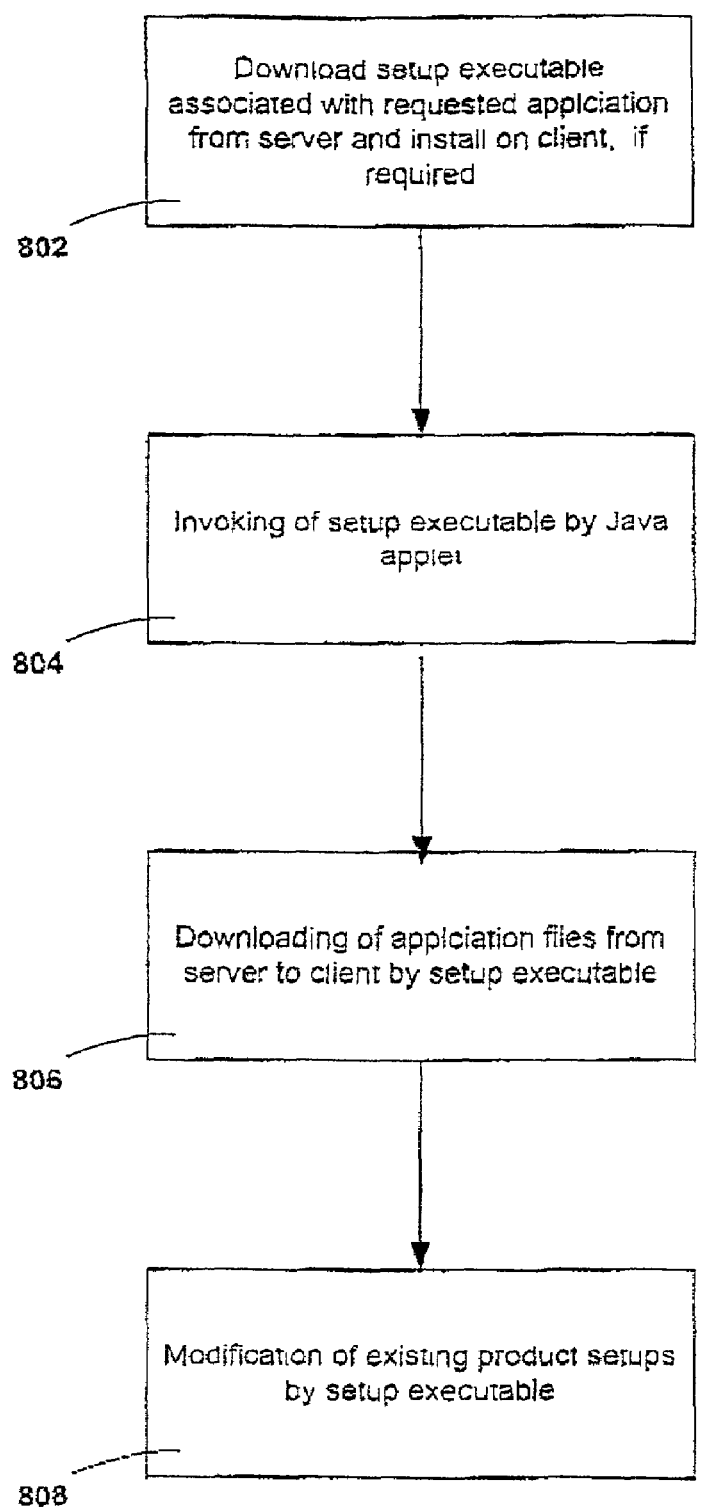
FIG. 8 is a flow chart illustrating the method of installing a requested application, in accordance with one embodiment of the invention.

An installation of the requested version of a requested application occurs when the requested version is not located on client 402 or the version of the application resident on client 402 is older than that on server 404. The method by which the installation occurs is illustrated in the flow chart of FIG. 8. If the requested application is not found on the client i.e. there is no entry in the registry 407 the setup executable for the requested application is downloaded from server 404 at step 802 and installed on client 402. The setup executable is included in set-up application 405 and is present on client 402 for an installed application. At step 804 Java applet 420 invokes the setup executable located on client 402. At step 806 the invoked setup executable downloads files associated with the requested application from server 404 and installs them on client 402 as necessary. At step 808 the setup executable performs the required modification of existing product setups to add a new registry key to facilitate the automatic installation process. The new registry key allows the user of client 402 to specify the installation location for the requested application.

The installation process of the application provision system is designed such that installation does not require client 402 be rebooted after the installation process. This functionality is made possible by ensuring native components are installed in a local environment so as to not interfere with the standard operating system components. This includes that there not be any writing or updating of system libraries which may be stored in memory at the time of installation. The setup executable invoked by the Java applet 420 install required libraries in a local directory hierarchy.

An application update will only occur if the locally installed application is older than the corresponding version on server 404. The administrator has the ability to configure the setup executable so that the update is silent. The setup program will be a standard installation executable that is capable of either initial or update installations. An update will automatically occur when a report for an outdated application is requested. The update and or installation will have minimal interaction with the user of client 402. In one embodiment a dialogue box requesting the location in which to install the requested application and a dialogue box indicating the installation has been completed. In an alternative embodiment the system administrator has the ability to configure the setup program so that the user of the client is minimally prompted for information such as the location for the installation of the requested application.

In the current embodiment the application provision system is presented for Win 32 platforms, In an alternative embodiment the operating system of the client could be any operating system including; Mac OS, Unix (Solaris, AIX, HP-UX, Linux), PalmOS and Windows CE. Other appropriate operating systems will be apparent to those skilled in the art.

In an alternative embodiment Java applet 420 communicates context information related to initial web page 417 to the requested application so that requested document 426 will be filtered to the same context (this may require changes to the applications to support this functionality) after initialization and loading of the requested document.

In an alternative embodiment the user of the client "authorizes" the operation by accepting a challenge to proceed. This response can be retained, if so desired by the user of the client, for subsequent use.

In the current embodiment there is provision that would limit a requested application to a single instance being executed. Such functionality is the responsibility of the requested application.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without deputing from the spirit and scope of the invention as defined in the claims. Therefore, the invention as defined in the claims must be accorded the broadest possible interpretation so as to encompass all such modifications and equivalent structures and functions.

What is claimed is:

1. An application provision system comprising:
    a server;
    a client comprising an operating system and a browser;
    a communication link operatively connecting the server and the client;
    a server resident process on the server for controlling the application provision system, and for providing a requested application from the server to the client;
    a database comprising information for the location of files associated with an application that can be installed on the client;
    a platform independent executable program deliverable by the server to the client for execution thereon, the platform independent executable program including security information for validation by the browser;
    a secure browser hosted process on the client resulting from execution of the platform independent executable program on the client;
    a communication pipe established within the communication link by the secure browser hosted process, the communication pipe being bidirectional, and enabling direct exclusive communication between the server resident process on the server, and the secure browser hosted process on the client through a secure channel, the secure browser hosted process accessing resources of the operating system on the client by installing, invoking or reading output from, executable files on the client.

2. An application provision system according to claim 1 wherein the server resident process includes a common gateway interface.

3. An application provision system according to claim 1 wherein the platform independent executable program is attached to a web page.

4. An application provision system according to claim 1 wherein the platform independent executable program is a Java applet.

5. An application provision system for providing a requested application to a client, the application provision system comprising:
    a server resident process on a server, the server connected to the client through a communication link, the server resident process controlling the application provision system and being able to respond to queries from the client;
    a database comprising information for the location of files associated with an application that can be Installed on the client;
    a file deliverable to the client, the file including a platform independent executable program and parameter information, the platform independent executable program including security information for validation by a browser; the file executable on the client resulting in a secure browser hosted process, the secure browser hosted process establishing a bidirectional direct exclusive communication pipe within a communication link between the server resident process on the server and an operating system on the client; and
    the bidirectional direct exclusive communication pipe being within the communications link; wherein the server resident process interacts with the secure browser hosted process through a secure channels in the bidirectional direct exclusive communication pipe; and wherein the secure browser hosted process accesses resources of the operating system on the client, installs, invokes or reads output from executable files on the client.

6. An application provision system according to claim 5 wherein the application provision system further comprises;
    at least one file associated with at least one application wherein the application is installable on the client; and
    at least one web page for downloading to the browser located on the client.

7. An application provision system according to claim 5 wherein the file deliverable to the client includes a Java applet.

8. An application provision system according to claim 5 wherein the server resident processes includes a common gateway interface.

9. A method of providing a requested application from a server to a client by an application provision system, the method comprising the steps of:
    providing a first web page to a client, the first web page having a link associated with a document;
    receiving from the client a request for the document by a server resident process;
    providing a second web page to the client, the second web page having a platform independent executable program, the platform independent executable program executable on the client resulting in a secure browser hosted process, the platform independent executable program including security information for validation by a browser; the secure browser hosted process establishing a bidirectional direct exclusive communication pipe between the server resident process on the server and an operating system on the client; the bidirectional direct exclusive communication pipe being within a communication link, wherein the server resident process interacts with the secure browser hosted process through a secure channel in the bidirectional direct exclusive communication pipe; and wherein the secure browser hosted process accesses resources of the operating system on the client, and requests an application to access the requested document; and
    providing the requested application to the client wherein the requested application allows the client to access the requested document.

10. A method of providing a requested application according to claim 9 wherein the step of providing the application provides the entire application to the client.

11. A method of providing a requested application according to claim 9 wherein the step of providing the application provides selected files associated with the application to the client to update an existing instance of the application on the client.

12. A method of receiving a requested application from a server by a client in an application provision system, the method comprising the steps of:
  receiving a first web page from a server, the first web page having a link associated with a document;
  providing a request for the document to a server resident process by the client;
  receiving a second web page from the server, the second web page having a platform independent executable program, the platform independent executable program executable on the client resulting in a secure browser hosted process, the platform independent executable program including security information for validation by the browser; the secure browser hosted process communicating with the server resident process through a bidirectional direct exclusive communication pipe between the server resident process on the server and an operating system on the client; the bidirectional direct exclusive communication pipe being within the communication link, wherein the server resident process interacts with the secure browser hosted process through a secure channel in the bidirectional direct exclusive communication pipe; and wherein the secure browser hosted process accesses resources of the operating system on the client, and requests an application to access the requested document; and
  receiving the requested application from the server wherein the requested application allows the client to access the requested document.

13. A method of receiving a requested application according to claim 12 wherein the step of receiving the application receives the entire application from the client.

14. A method of receiving a requested application according to claim 12 wherein the step of receiving the application receives selected files associated with the application from the server to update an existing instance of the application on the client.

15. A method of providing a requested application from a server to a client connected through a communication link, the server comprising a web page for downloading by the client, the method comprising the steps of:
  providing a platform independent executable program, the platform independent executable program including security information for validation by a browser, and a server resident process on a server;
  delivering the platform independent executable program to the client during the downloading of a web page to which the platform independent executable program is attached, the platform independent executable program executable on the client resulting in a secure browser hosted process, the secure browser hosted process interacting directly with an operating system resident on the client;
  receiving a request for an application from the secure browser hosted process, the secure browser hosted process communicating with the server resident process through a secure channel in a bidirectional direct exclusive communication pipe, the bidirectional direct exclusive communication pipe being within the communication link; and
  providing the requested application to the client, through the secure browser hosted process and the server resident process.

16. A method of automatic provisioning of a requested application from a server to a client, the server and the client being connected through a communication link, the client comprises a browser and an operating system, the method comprising the steps of:
  downloading a first web page containing a link, the link being associated with a document, by the client from the server;
  selecting the link on the downloaded first web page;
  downloading a second web page by the client from the server, the second web page comprising a platform independent executable program, the platform independent executable program including security information for validation by a browser;
  opening a new window of the browser on the client;
  invoking the platform independent executable program resulting in a secure browser hosted process, the secure browser hosted process interacting directly with an operating system of the client;
  invoking a server resident process, the server resident process communicating with the browser hosted process through a secure channel in a bidirectional direct exclusive communication pipe, the bidirectional direct exclusive communication pipe being within the communication link;
  scanning the client, by the browser hosted process to determine if the requested application is installed on the client;
  providing the requested application to the client if the requested application is not installed on the client; and
  invoking the requested application.

17. A method according to claim 16 wherein the step of providing the requested application to the client comprises the steps of:
  providing a setup executable file associated with the requested application by the server to the client, if the setup executable file is absent on the client;
  installing the setup executable file on the client;
  invoking the setup executable file;
  providing files associated with a requested version of the requested application by the setup executable file from the server to the client; and
  installing native components on the client such that the native components do not interfere with the operating system of the client.

18. A method according to claim 16 wherein the step of providing the requested application comprises the steps of:
  determining if a version of the requested application previously installed on the client is the same as a version of the requested application located on the server; and
  installing the requested application on the client if the version of the requested application installed on the client is not the version of the requested application located on the server.

19. A method of automatically provisioning a requested application from a server to a client; the server and client being connected through a communication link, the client comprising a browser and an operating system, the method comprising the steps of:
  providing a first web page to the client, the first web page having a link, the link being associated with a document accessible with the requested application;
  receiving a request for a second web page by way of the client selecting the link associated with the document;
  providing the second web page to the client, the second web page comprising a platform independent executable program executable on a client resulting in a secure browser hosted process, the platform independent executable program including security information for validation by a browser, the secure browser hosted process interacting directly with an operating system of the client;

receiving communications from the secure browser hosted process through a secure channel in a bidirectional direct exclusive communication pipe, the bidirectional direct exclusive communication pipe being within the communication link;

invoking a server resident process;

communicating with the secure browser hosted process located on the client to facilitate determination of whether the requested application is installed on the client;

providing files associated with the requested application to the client for installation of the requested application on the client, if the requested application is not installed on the client;

transferring files associated with the requested application to the client for installation of the application on the client; and invoking the requested application.

20. A method according to claim 19 wherein the step of providing files comprises the steps of:

providing a setup executable program associated with the requested application by the server to the client, if the setup executable program does not exist on the client;

installing the setup executable program on the client;

invoking the setup executable program;

providing files associated with a requested version of the requested application by the setup executable program from the server to the client; and installing native components on the client such that the native components do not interfere with the operating system of the client.

21. A method according to claim 19 wherein the step of providing files comprises the steps of:

comparing version information of the requested application installed on the client with version information of the requested application located on the server; and transferring files associated with the requested application to the client for installation of the requested application on the client if the version of the requested application on the client is not the same as the version of the application located on the server.

22. A storage medium readable by a computer encoding a computer program for execution by the computer to carry out a method for providing a requested application from a server to a client by an application provision system, the computer program comprising:

code means for providing a first web page to a client, the first web page having a link associated with a document;

code means for receiving from the client a request for the document by a server resident process;

code means for providing a second web page to the client, the second web page having client-server functionality, the client-server functionality executable on the client resulting in a secure browser hosted process, the browser hosted process establishing secure channel in a bidirectional direct exclusive communication pipe between the server resident process on the server end an operating system on the client; the bidirectional direct exclusive communication pipe being within the communication link, wherein the server resident process interacts with the browser hosted process through the bidirectional direct exclusive communication pipe, and wherein the secure browser hosted process accesses resources of the operating system on the client, and requests an application to access the requested document; and code means for providing the requested application to the client wherein the requested application allows the client to access the requested document.

* * * * *